United States Patent
Zhong

(10) Patent No.: US 9,652,869 B2
(45) Date of Patent: May 16, 2017

(54) INTERFACE ADJUSTMENT METHOD, APPARATUS, AND TERMINAL

(71) Applicant: TENCENT TECHNOLOGY (SHENZHEN) COMPANY LIMITED, Shenzhen (CN)

(72) Inventor: Mingliang Zhong, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 14/733,829

(22) Filed: Jun. 8, 2015

(65) Prior Publication Data

US 2015/0310637 A1 Oct. 29, 2015

Related U.S. Application Data

(63) Continuation of application No. PCT/CN2013/086489, filed on Nov. 4, 2013.

(30) Foreign Application Priority Data

Dec. 6, 2012 (CN) .......................... 2012-10519755

(51) Int. Cl.
*G06T 11/00* (2006.01)
*G09G 3/20* (2006.01)
*G06T 7/40* (2006.01)
*H04N 5/232* (2006.01)
(Continued)

(52) U.S. Cl.
CPC ............ *G06T 11/001* (2013.01); *G06T 7/408* (2013.01); *G09G 3/20* (2013.01); *H04N 5/23222* (2013.01);
(Continued)

(58) Field of Classification Search
CPC .... H04N 1/00835; H04N 1/4005; H04N 5/58; H04N 5/23222; H04N 5/23229;
(Continued)

(56) References Cited

U.S. PATENT DOCUMENTS 5,574,764 A * 11/1996 Granfors .............. H04N 5/2351
348/E5.035
9,330,606 B2 * 5/2016 Barnhoefer .......... G09G 3/3406
(Continued)

FOREIGN PATENT DOCUMENTS

CN 101453563 A 6/2009
CN 102025945 A 4/2011
(Continued)

OTHER PUBLICATIONS

The World Intellectual Property Organization (WIPO) International Search Report for PCT/CN2013/086489 Feb. 20, 2014.

*Primary Examiner* — Pritham Prabhakher
(74) *Attorney, Agent, or Firm* — Anova Law Group, PLLC

(57) ABSTRACT

The present disclosure belongs to the field of computer technologies and discloses an interface adjustment method, apparatus, and terminal. The method includes: capturing a current image by an image capture device of the terminal; analyzing current ambient brightness according to the current image; and adjusting display of an interface on the terminal according to the current ambient brightness. According to the present disclosure, current ambient brightness is obtained by capturing a current image and analyzing the current image, thereby implementing interface adjustment. Such approach solves the problem that an existing interface adjustment method can only be used in a smart TV having a light sensor, and any terminal having an image capture function can adjust an interface by sensing light.

7 Claims, 3 Drawing Sheets

(51) Int. Cl.
*H04N 21/422* (2011.01)
*H04N 21/485* (2011.01)

(52) U.S. Cl.
CPC ............. *H04N 5/23229* (2013.01); *G06T 2207/10004* (2013.01); *G09G 2320/0626* (2013.01); *G09G 2360/144* (2013.01); *H04N 21/42202* (2013.01); *H04N 21/4854* (2013.01)

(58) Field of Classification Search
CPC .......... H04N 21/42202; H04N 21/4854; G06T 11/001; G06T 7/408; G06T 2207/10004; G09G 3/20; G09G 3/3406; G09G 5/028; G09G 2320/0626; G09G 2320/0673; G09G 2360/144
USPC ...................................................... 348/207.1
See application file for complete search history.

(56) References Cited

U.S. PATENT DOCUMENTS

| | | | | |
|---|---|---|---|---|
| 2009/0251448 | A1* | 10/2009 | Kuwabara | H04N 5/20 345/207 |
| 2012/0249789 | A1* | 10/2012 | Satoh | G06K 9/00805 348/143 |
| 2012/0257787 | A1* | 10/2012 | Ogasawara | G06T 7/0044 382/103 |
| 2012/0310575 | A1* | 12/2012 | Cheng | G09G 3/006 702/82 |
| 2013/0069924 | A1* | 3/2013 | Robinson | G09G 3/20 345/207 |
| 2013/0278576 | A1* | 10/2013 | Lee | G09G 3/20 345/207 |
| 2013/0328842 | A1* | 12/2013 | Barnhoefer | G09G 3/3406 345/207 |
| 2014/0104436 | A1* | 4/2014 | Bork | H04N 5/58 348/184 |
| 2014/0132578 | A1* | 5/2014 | Zheng | G09G 5/10 345/207 |

FOREIGN PATENT DOCUMENTS

| | | |
|---|---|---|
| CN | 102262536 A | 11/2011 |
| CN | 103165103 A | 6/2013 |
| WO | 2008129596 A1 | 10/2008 |

* cited by examiner

INTERFACE ADJUSTMENT METHOD, APPARATUS, AND TERMINAL

RELATED APPLICATION

This application is a continuation application of PCT patent application no. PCT/CN2013/086489, filed on Nov. 4, 2013, which claims priority to Chinese Patent Application No. 201210519755.3, filed with the Chinese Patent Office on Dec. 6, 2012 and entitled "INTERFACE ADJUSTMENT METHOD, APPARATUS, AND TERMINAL," the content of all of which is incorporated by reference in its entirety.

FIELD OF THE TECHNOLOGY

The present disclosure relates to the field of computer technologies, and in particular, to an interface adjustment method, apparatus, and a terminal.

BACKGROUND OF THE DISCLOSURE

With the development of smart TV technologies, the smart TV is becoming one of intelligent terminals widely used in homes.

Currently, some smart TVs can adjust display interfaces by sensing light intensity. An interface adjustment method used by these smart TVs mainly includes: first, setting a light sensor on a smart TV and acquiring current light intensity by using the light sensor; second, reporting, by the light sensor, the acquired current light intensity to a main control module of the smart TV, and selecting, by the main control module, a to-be-displayed system interface according to the current light intensity (for example, when the current light intensity is relatively low, the main control module may selects a type of interface that is relatively dark as a to-be-displayed system interface); and third, instructing, by the main control module, a display module to display the type of interface that is relatively dark.

In a process of implementing the present disclosure, the inventor finds that the existing technology has at least the following problem: the foregoing interface adjustment method often can only be used in a smart TV having a light sensor. In other words, many smart TVs without light sensors often cannot use the foregoing interface adjustment method.

SUMMARY

To solve the problem that the existing interface adjustment method can only be used in a smart TV having a light sensor, embodiments of the present invention provide an interface adjustment method and apparatus, and a terminal. The technical solutions are as follows.

In one aspect, an interface adjustment method for a terminal is provided, the method includes capturing a current image by an image capture device of the terminal; analyzing current ambient brightness according to the current image; and adjusting display of an interface on the terminal according to the current ambient brightness.

Further, the analyzing current ambient brightness according to the current image includes determining the current ambient brightness according to brightness of some or all pixels in the current image.

Further, the analyzing current ambient brightness according to the current image includes calculating an average brightness value of all pixels in the current image and using the average brightness value as the current ambient brightness.

Further, the analyzing current ambient brightness according to the current image includes extracting a local area or sample pixels from the current image; and calculating an average brightness value of the extracted local area or sample pixels, and using the average brightness value as the current ambient brightness.

Further, the adjusting display of an interface according to the current ambient brightness includes selecting one set of interface from at least two sets of preset interfaces as a to-be-displayed interface according to the current ambient brightness and a preset relationship, where the preset relationship is a one-to-one correspondence between a brightness range of the current ambient brightness and a preset interface.

Further, the interface includes one or more of a background pattern, background brightness, background color contrast, and background color saturation.

In another aspect, an interface adjustment apparatus is provided, the apparatus includes an image capture module configured to capture a current image; a brightness analysis module configured to analyze current ambient brightness according to the current image captured by the image capture module; and an interface adjustment module configured to adjust display of an interface according to the current ambient brightness obtained through analysis by the brightness analysis module.

Further, the brightness analysis module is configured to determine the current ambient brightness according to brightness of some or all pixels in the current image.

Further, the brightness analysis module is configured to calculate an average brightness value of all pixels in the current image and use the average brightness value as the current ambient brightness.

Further, the brightness analysis module includes a sampling unit and a calculating unit. The sampling unit is configured to extract a local area or sample pixels from the current image; and the calculating unit is configured to calculate an average brightness value of the local area or the sample pixels extracted by the sampling unit, and use the average brightness value as the current ambient brightness.

Further, the interface adjustment module is configured to select one set of interface from at least two sets of preset interfaces as a to-be-displayed interface according to the current ambient brightness and a preset relationship, where the preset relationship is a one-to-one correspondence between a brightness range of the current ambient brightness and a preset interface.

Further, the interface adjusted by the interface adjustment module includes one or more of a background pattern, background brightness, background color contrast, and background color saturation.

In another aspect, a terminal is provided, including the interface adjustment apparatus provided in the above aspect.

In another aspect, a non-transitory computer-readable medium is provided. The computer-readable medium has computer program for, when being executed by a processor, performing an interface adjustment method for a terminal. The method includes capturing a current image by an image capture device of the terminal; analyzing current ambient brightness according to the current image; and adjusting display of an interface on the terminal according to the current ambient brightness.

The technical solutions provided by the embodiments of the present invention may have various beneficial effects.

For example, current ambient brightness is obtained by capturing a current image and analyzing the current image, thereby implementing interface adjustment, which solves the problem that an existing interface adjustment method can only be used in a smart TV having a light sensor, and enable any terminal having an image capture function to adjust an interface by ambient brightness.

BRIEF DESCRIPTION OF THE DRAWINGS

To illustrate the technical solutions in the embodiments of the present invention more clearly, the following briefly introduces the accompanying drawings for describing the embodiments. Apparently, the accompanying drawings merely show some embodiments of the present invention, and those ordinary skilled in the art may derive other drawings from these accompanying drawings without creative efforts.

DESCRIPTION OF EMBODIMENTS

To make the objectives, technical solutions, and advantages of the present disclosure more clear, the followings further describe the embodiments of the present disclosure in detail with reference to the accompanying drawings.

Embodiment 1

Figure 1:
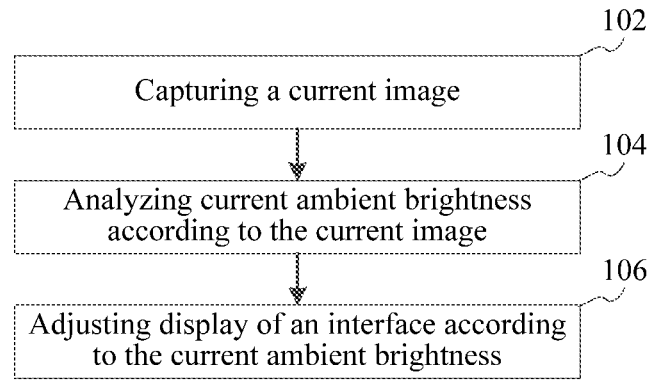
FIG. 1 illustrates a flowchart of an interface adjustment method according to Embodiment 1 of the present invention.

Referring to FIG. 1, FIG. 1 shows a flowchart of an interface adjustment method according to Embodiment 1 of the present invention. The interface adjustment method may be used in a terminal having an image capture device such as a camera, and the terminal may be a smart TV, a smart phone, a tablet computer, or the like. The interface adjustment method includes:

Step 102: Capturing a current image. The camera in the terminal may capture a current image at current time in a current environment, for example, a front-facing camera of a smart TV captures a current image of an environment in front of a TV screen of the smart TV. The camera may be a built-in camera, or may be an external camera.

Step 104: Analyzing current ambient brightness according to the current image. The terminal may analyze current ambient brightness according to the current image captured by the camera.

Step 106: Adjusting display of an interface according to the current ambient brightness. After obtaining the current ambient brightness through analysis, the terminal may select one set of interface from several sets of preset interfaces for display. For example, three sets of interfaces are preset in the terminal, which are a high-brightness interface, a normal interface, and a soft interface respectively. Assuming that the terminal finds by analysis that the current ambient brightness is relatively low, the terminal may select the soft interface as a to-be-displayed interface.

Thus, according to the interface adjustment method provided by this embodiment of the present invention, current ambient brightness is obtained by capturing a current image and analyzing the current image, thereby implementing interface adjustment. Such method solves the problem that an existing interface adjustment method can only be used in a smart TV having a light sensor, and a terminal having an image capture function can adjust an interface based on the ambient brightness.

Embodiment 2

Figure 2:
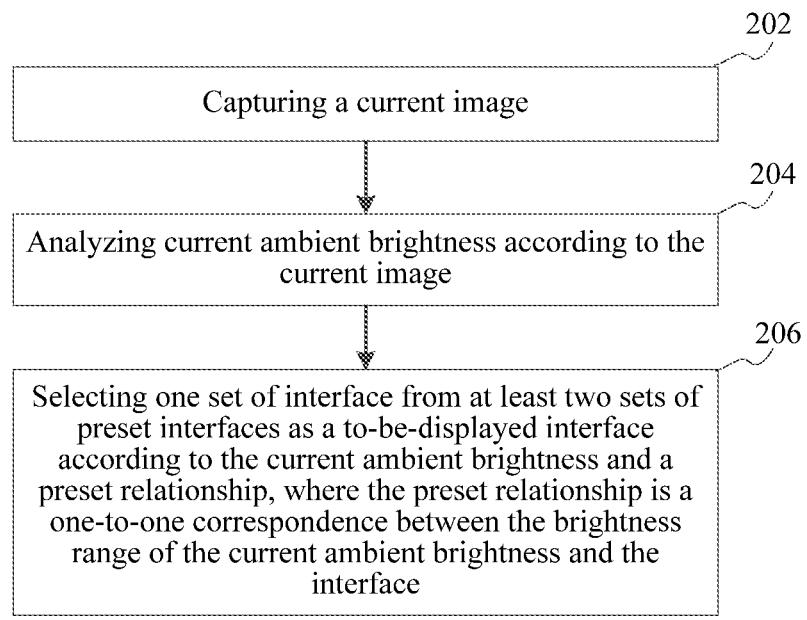
FIG. 2 illustrates a flowchart of an interface adjustment method according to Embodiment 2 of the present invention.

Referring to FIG. 2, FIG. 2 shows a flowchart of an interface adjustment method according to Embodiment 2 of the present invention. The interface adjustment method may be used in a terminal having an image capture device such as a camera, and the terminal may be a smart TV, a smart phone, a tablet computer, or the like. The interface adjustment method includes:

Step 202: Capturing a current image. The camera in the terminal may capture a current image at current time in a current environment. For example, a front-facing camera of a smart TV captures a current image of an environment in front of a TV screen. The camera may be a built-in camera, or may be an external camera.

The terminal may also capture a current image at a preset time interval, and the preset time interval may be set by a user or set by default in the terminal.

Step 204: Analyzing current ambient brightness according to the current image. The terminal may analyze current ambient brightness according to the current image captured by the camera. Specifically, the terminal may determine the current ambient brightness according to brightness of some or all pixels in the current image, for example, the terminal may use an average brightness value or a total brightness value of some or all pixels as the current ambient brightness.

Specifically, any one of the following three analysis methods may be used to implement this step.

The first method: an average brightness value of all pixels in the current image is calculated and the average brightness value is used as the current ambient brightness. For example, if the size of the image captured by the camera is 640*480 pixels, the terminal first accumulates brightness data of 640*480=307200 pixels, then divides the accumulated brightness data by 307200 to obtain an average brightness value, and uses the average brightness value as the current ambient brightness, where a value rang of the average brightness value may be (0, 255).

The second method: a local area is extracted from the current image, an average brightness value of the extracted local area is calculated, and the average brightness value is used as the current ambient brightness.

For example, if the size of the image captured by the camera is 640*480 pixels, the terminal first extracts, at a central area of the image, an area having 320*240 pixels as a local area, then accumulates brightness data of 320*240=76800 pixels, divides the accumulated brightness data by 76800 to obtain an average brightness value, and uses the average brightness value as the current ambient brightness, where a value rang of the average brightness value may be (0, 255). Other areas of the image, e.g., left, right, top, or bottom areas, may also be used.

Certainly, the terminal may also evenly extract multiple local areas from the current image for calculation, for example, the terminal evenly extracts multiple areas having a size of 16*16 pixels from the current image for calculation.

The third method: sample pixels are extracted from the current image, an average brightness value of the extracted sample pixels is calculated, and the average brightness value is used as the current ambient brightness.

For example, if the size of the image captured by the camera is 640*480 pixels, the terminal extracts, in a column direction, one row at intervals of three rows as a sample row, then extracts one sample pixel at intervals of three pixels in each sample row, and finally, calculates an average brightness value of the extracted sample pixels, and uses the average brightness value as the current ambient brightness. Similarly, the sample pixels may also be extracted from various rows instead of columns, or be extracted from other different patterns.

Step 206: Selecting one set of interface from at least two sets of preset interfaces as a to-be-displayed interface according to the current ambient brightness and a preset relationship, where the preset relationship is a one-to-one correspondence between the brightness ranges of the current ambient brightness and the interfaces.

The terminal may store at least two sets of interfaces in advance. For example, the terminal stores three sets of interfaces in advance, namely, a high-brightness interface, a normal interface, and a soft interface respectively. The terminal may further store, in advance, a one-to-one correspondence between the brightness range of the current ambient brightness and the interfaces as a preset relationship. For example, when the current ambient brightness belongs to a brightness range [0-64], the current ambient brightness corresponds to the high-brightness interface; when the current ambient brightness belongs to a brightness range [65-128], the current ambient brightness corresponds to the common interface; and when the current ambient brightness belongs to a brightness range [129-255], the current ambient brightness corresponds to the soft interface.

After calculating the current ambient brightness in the previous step, the terminal selects one set of interface from the at least two sets of preset interfaces as a to-be-displayed interface according to the current ambient brightness and the preset relationship. For example, when the current ambient brightness calculated by the terminal is 202, and according to the preset relationship, the soft interface may be selected as the to-be-displayed interface.

The interface may be a system interface, or may be an interface of an application program. The interface may include one or more of a background pattern, background brightness, background color contrast, and background color saturation.

Additionally, in specific implementation, all the three steps of this embodiment may be implemented by a system, or may be implemented by an application program; or the first two steps may be implemented by a system and the last step may be implemented by an application program. The ultimate purpose is to make both the system interface and the application program interface capable of adjusting interface display by ambient brightness.

Thus, according to the interface adjustment method provided by this embodiment of the present invention, current ambient brightness is obtained by capturing a current image and analyzing the current image, thereby implementing interface adjustment. Such method solves the problem that an existing interface adjustment method can only be used in a smart TV having a light sensor, and any terminal having an image capture function can adjust an interface by ambient brightness. In addition, by extracting a local area or sample pixels to calculate brightness data, the amount of calculation can be reduced, and the display adjustment of an interface can be completed more quickly.

Embodiment 3

Figure 3:
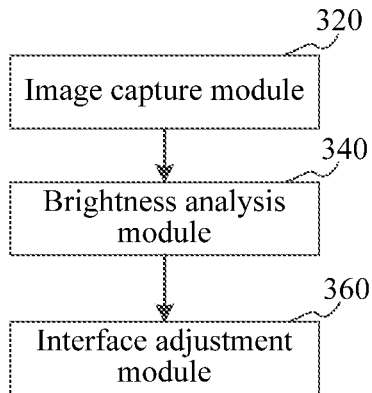
FIG. 3 illustrates a schematic diagram of an interface adjustment apparatus according to Embodiment 3 of the present invention.

Referring to FIG. 3, FIG. 3 shows a structural block diagram of an interface adjustment apparatus according to Embodiment 3 of the present invention. The interface adjustment apparatus may be implemented as a part of a terminal having an image capture device such as a camera, and the terminal may be a smart TV, a smart phone, a tablet computer, or the like. The interface adjustment apparatus includes an image capture module 320, a brightness analysis module 340, and an interface adjustment module 360.

The image capture module 320 is configured to capture a current image; the brightness analysis module 340 is configured to analyze current ambient brightness according to the current image captured by the image capture module 320; and the interface adjustment module 360 is configured to adjust display of an interface according to the current ambient brightness obtained through analysis by the brightness analysis module 340. Details of the configured operations may be found in above sections.

Thus, the interface adjustment apparatus provided by this embodiment of the present invention obtains current ambient brightness by capturing a current image and analyzing the current image, thereby implementing interface adjustment. Such apparatus solves the problem that an existing interface adjustment method can only be used in a smart TV having a light sensor, and any terminal having an image capture function can adjust an interface by sensing ambient brightness.

Embodiment 4

Figure 4:
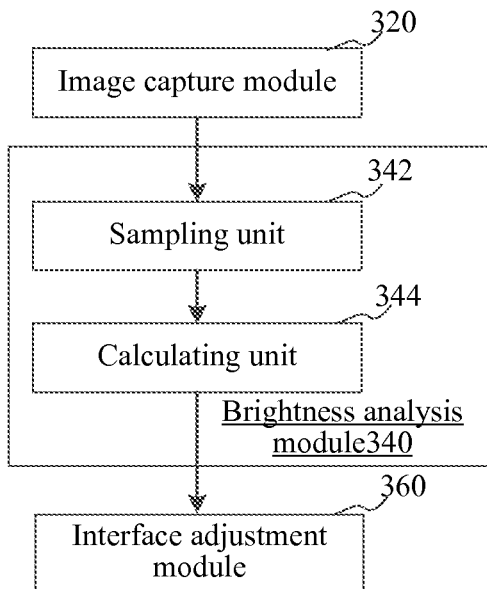
FIG. 4 illustrates a schematic diagram of an interface adjustment apparatus according to Embodiment 4 of the present invention.

Referring to FIG. 4, FIG. 4 shows a structural block diagram of an interface adjustment apparatus according to Embodiment 4 of the present invention. The interface adjustment apparatus may be implemented as a part of a terminal having an image capture device such as a camera, and the terminal may be a smart TV, a smart phone, a tablet computer, or the like. The interface adjustment apparatus includes an image capture module 320, a brightness analysis module 340, and an interface adjustment module 360.

The image capture module 320 is configured to capture a current image. Specifically, the image capture module 320 may capture a current image frame at a preset time interval. The brightness analysis module 340 is configured to analyze current ambient brightness according to the current image captured by the image capture module 320. Further, the brightness analysis module 340 is specifically configured to determine the current ambient brightness according to brightness of some or all pixels in the current image.

Specifically, in one implementation, the brightness analysis module 340 may be configured to calculate an average brightness value of all pixels in the current image and use the average brightness value as the current ambient brightness. In another implementation, the brightness analysis module 340 may include a sampling unit 342 and a calculating unit 344.

The sampling unit 342 is configured to extract a local area or sample pixels from the current image captured by the image capture module 320. The calculating unit 344 is configured to calculate an average brightness value of the local area or the sample pixels extracted by the sampling unit 342, and use the average brightness value as the current ambient brightness.

The interface adjustment module 360 is configured to adjust display of an interface according to the current ambient brightness obtained through analysis by the brightness analysis module 340. Specifically, the interface adjustment module 360 is specifically configured to select one set of interface from at least two sets of preset interfaces as a to-be-displayed interface according to the current ambient brightness and a preset relationship, where the preset relationship is a one-to-one correspondence between brightness ranges of the current ambient brightness and the preset interfaces.

The interface adjusted by the interface adjustment module 360 includes one or more of a background pattern, background brightness, background color contrast, and background color saturation.

Thus, the interface adjustment apparatus provided by this embodiment of the present invention obtains current ambient brightness by capturing a current image and analyzing the current image, thereby implementing interface adjustment. Such apparatus solves the problem that an existing interface adjustment method can only be used in a smart TV having a light sensor, and any terminal having an image capture function can adjust an interface by ambient brightness. In addition, by extracting a local area or sample pixels to calculate brightness data, the amount of calculation can be reduced, and the display adjustment of an interface can be completed more quickly.

Embodiment 5

Figure 5:
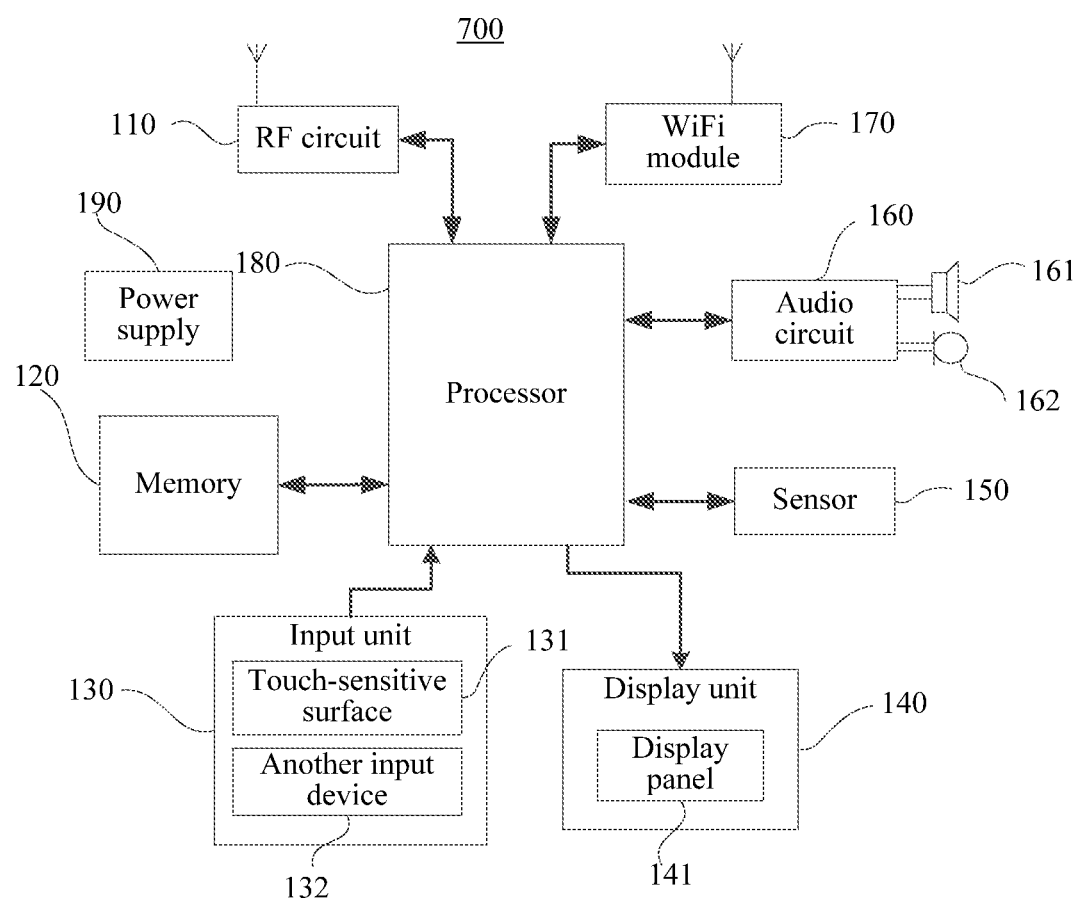
FIG. 5 illustrates a schematic diagram of a terminal according to Embodiment 5 of the present invention.

Referring to FIG. 5, FIG. 5 shows a schematic structural diagram of a terminal having a touch-sensitive surface and related to the embodiments of the present invention. The terminal may be configured to implement the interface adjustment method provided by the foregoing embodiments.

Specifically, the terminal 700 may include various components, such as a radio frequency (RF) circuit 110, a memory 120 including one or more computer readable storage media, an input unit 130, a display unit 140, a sensor 150, an audio circuit 160, a wireless fidelity (WiFi) module 170, a processor 180 including one or more processing cores, and a power supply 190. A person skilled in the art may understand that the structure of the terminal shown in FIG. 5 does not constitute a limitation to the terminal, and the terminal may include more components or fewer components than those shown in the figure, or some components may be combined, or a different component layout may be used.

The RF circuit 110 may be configured to receive and send signals during an information receiving and sending process or a call process. Particularly, the RF circuit 110 receives downlink information from a base station, then delivers the downlink information to one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 700, and the like. In addition, the memory 120 may include a high speed random access memory, and may also include a non-volatile memory such as at least one magnetic disk storage device, a flash memory, or another volatile solid-state storage device. Correspondingly, the memory 120 may further include a memory controller, so as to provide access to the memory 120.

The input unit 130 may be configured to receive input digit or character information, and generate a keyboard, mouse, joystick, optical, or track ball signal input related to the user setting and function control. Specifically, the input unit 130 may include a touch-sensitive surface 131 and another input device 132. The touch-sensitive surface 131, which may also be referred to as a touch screen or a touch panel, may collect a touch operation of a user on or near the touch-sensitive surface (such as an operation of a user on or near the touch-sensitive surface 131 by using any suitable object or accessory, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be may be a resistive, capacitive, infrared, or surface sound wave type touch-sensitive surface. In addition to the touch-sensitive surface 131, the input unit 130 may further include the input device 132. Specifically, the input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user interfaces of the terminal 700. The graphical user interfaces may be formed by a graph, a text, an icon, a video, or any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine the type of the touch event. Then, the processor 180 provides a corresponding visual output on the display panel 141 according to the type of the touch event. Although, in FIG. 5, the touch-sensitive surface 131 and the display panel 141 are used as two separate components to implement input and output functions, in some embodiments, the touch-sensitive surface 131 and the display panel 141 may be integrated to implement the input and output functions.

The terminal 700 may further include at least one sensor 150, such as an optical sensor, a motion sensor, and other sensors. Specifically, the optical sensor may include an ambient light sensor and a proximity sensor. The ambient light sensor can adjust luminance of the display panel 141 according to brightness of the ambient light. The proximity sensor may switch off the display panel 141 and/or backlight when the terminal 700 is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal 700, are not further described herein.

The audio circuit 160, a loudspeaker 161, and a microphone 162 may provide audio interfaces between the user and the terminal 700. The audio circuit 160 may convert received audio data into an electric signal and transmit the electric signal to the loudspeaker 161. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal device by using the RF circuit 110, or outputs the audio data to the memory 120 for further processing. The audio circuit 160 may further include an earplug jack, so as to provide communication between a peripheral earphone and the terminal 700.

WiFi is a short distance wireless transmission technology. The terminal 700 may help, by using the WiFi module 170, the user to receive and send e-mails, browse a webpage, access streaming media, and so on, which provides wireless broadband Internet access for the user. Although FIG. 5 shows the WiFi module 170, it may be understood that the WiFi module is not a necessary component of the terminal 700, and when required, the WiFi module may be omitted as long as the scope of the essence of the present disclosure is not changed.

The processor 180 is the control center of the terminal 700, and is connected to various parts of the mobile phone by using various interfaces and lines. By running or executing the software program and/or module stored in the memory 120, and invoking data stored in the memory 120, the processor 180 performs various functions and data processing of the terminal 700, thereby performing overall monitoring on the mobile phone. Optionally, the processor 180 may include one or more processing cores. Preferably, the processor 180 may integrate an application processor and a modem. The application processor mainly processes an operating system, a user interface, an application program, and the like. The modem mainly processes wireless communication. It may be understood that the foregoing modem may also not be integrated into the processor 180.

The terminal 700 further includes the power supply 190 (such as a battery) for supplying power to the components. Preferably, the power supply may be logically connected to the processor 180 by using a power management system, thereby implementing functions such as charging, discharging and power consumption management by using the power management system. The power supply 190 may further include one or more of a direct current or alternating current power supply, a re-charging system, a power failure detection circuit, a power supply converter or inverter, a power supply state indicator, and any other components.

Although not shown in the figure, the terminal 700 may further include a camera, a Bluetooth module, and the like, which are not further described herein. Specifically, in this embodiment, the display unit of the terminal 700 is a touch screen display, and the terminal 700 further includes a memory and one or more programs. The one or more programs are stored in the memory and configured to be executed by one or more processors. The one or more programs contain instructions used for implementing various operations, including capturing a current image; analyzing current ambient brightness according to the current image; and adjusting display of an interface according to the current ambient brightness.

Further, the analyzing current ambient brightness according to the current image specifically includes determining current ambient brightness according to brightness of some or all pixels in the current image.

Further, the analyzing current ambient brightness according to the current image specifically includes calculating an average brightness value of all pixels in the current image and using the average brightness value as the current ambient brightness.

Further, the analyzing current ambient brightness according to the current image specifically includes extracting a local area or sample pixels from the current image; and calculating an average brightness value of the extracted local area or sample pixels, and using the average brightness value as the current ambient brightness.

Further, the adjusting display of an interface according to the current ambient brightness specifically includes selecting one set of interface from at least two sets of preset interfaces as a to-be-displayed interface according to the current ambient brightness and a preset relationship, where the preset relationship is a one-to-one correspondence between brightness ranges to which the current ambient brightness belongs and the interfaces.

Further, the interface includes one or more of a background pattern, background brightness, background color contrast, and background color saturation.

Thus, the terminal provided by this embodiment of the present invention obtains current ambient brightness by capturing a current image and analyzing the current image, thereby implementing interface adjustment. The terminal solves the problem that an existing interface adjustment method can only be used in a smart TV having a light sensor, and any terminal having an image capture function can adjust an interface by sensing light.

A person of ordinary skill in the art may understand that all or some of the steps of the foregoing embodiments may be implemented by using hardware, or may be implemented by a program instructing relevant hardware. The program may be stored in a computer readable storage medium. The storage medium mentioned above may be a read-only memory, a magnetic disk, an optical disc, or the like.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. An interface adjustment method for a terminal, comprising:
capturing a current image by an image capture device of the terminal;
analyzing current ambient brightness according to the current image; and
adjusting display of an interface on the terminal according to the current ambient brightness;
wherein the analyzing current ambient brightness according to the current image further comprises:
extracting sample pixels of a local area from the current image, the local area being a central area of the current image;
extracting, in a column direction, one row at intervals of M rows as a sample row to obtain sample rows of the current image, M being an integer greater than; and
extracting one sample pixel at intervals of N pixels in each of the sample rows to obtain the sample pixels of the current image, N being an integer greater than 2;
calculating an average brightness value of the sample pixels of the extracted local area, and using the average brightness value as the current ambient brightness,
wherein the adjusting display of an interface according to the current ambient brightness comprises:
selecting one set of interface from at least two sets of preset interfaces as a to-be-displayed interface according to the current ambient brightness and a preset relationship, the preset relationship being a one-to-one correspondence between a brightness range of the current ambient brightness and a preset interface.

2. The interface adjustment method according to claim 1, wherein the interface comprises one or more of a background pattern, background brightness, background color contrast, and background color saturation.

3. The interface adjustment apparatus according to claim 1, further comprising:
capturing the current image at a preset time interval; and
adjusting display of the interface on the terminal according to the current ambient brightness.

4. An interface adjustment apparatus, comprising:
a processor configured to execute:
an image capture module configured to capture a current image using a camera;
a brightness analysis module configured to analyze current ambient brightness according to the current image captured by the image capture module; and
an interface adjustment module configured to adjust display of an interface according to the current ambient brightness obtained through analysis by the brightness analysis module;
wherein the brightness analysis module comprises:
a sampling unit configured to extract sample pixels from the current image, including:
extracting, in a column direction, one row at intervals of M rows as a sample row to obtain sample rows of the current image, M being an integer greater than 2; and
extracting one sample pixel at intervals of N pixels in each of the sample rows to obtain the sample pixels of the current image, N being an integer greater than 2; and
a calculating unit configured to calculate an average brightness value of the sample pixels extracted by the sampling unit, and use the average brightness value as the current ambient brightness,
wherein the interface adjustment module is configured to select one set of interface from at least two sets of preset interfaces as a to-be-displayed interface according to the current ambient brightness and a preset relationship, the preset relationship being a one-to-one correspondence between a brightness range of the current ambient brightness and a preset interface.

5. The interface adjustment apparatus according to claim 4, wherein the interface adjusted by the interface adjustment module comprises one or more of a background pattern, background brightness, background color contrast, and background color saturation.

6. A non-transitory computer-readable medium having computer program for, when being executed by a processor, performing an interface adjustment method for a terminal, the method comprising:
capturing a current image by an image capture device of the terminal;
analyzing current ambient brightness according to the current image; and
adjusting display of an interface on the terminal according to the current ambient brightness;
wherein the analyzing current ambient brightness according to the current image further comprises:
extracting sample pixels of a local area from the current image, the local area being a central area of the current image;
extracting, in a column direction, one row at intervals of M rows as a sample row to obtain sample rows of the current image, M being an integer greater than; and
extracting one sample pixel at intervals of N pixels in each of the sample rows to obtain the sample pixels of the current image, N being an integer greater than 2;
calculating an average brightness value of the sample pixels of the extracted local area, and using the average brightness value as the current ambient brightness,
wherein the adjusting display of an interface according to the current ambient brightness comprises:
selecting one set of interface from at least two sets of preset interfaces as a to-be-displayed interface according to the current ambient brightness and a preset relationship, the preset relationship being a one-to-one correspondence between a brightness range of the current ambient brightness and a preset interface.

7. The non-transitory computer-readable medium according to claim 6, wherein the interface comprises one or more of a background pattern, background brightness, background color contrast, and background color saturation.

* * * * *